United States Patent [19]

Cattanach et al.

[11] Patent Number: 4,770,838
[45] Date of Patent: Sep. 13, 1988

[54] METHOD OF PRODUCING SHAPED ARTICLES FROM REINFORCED COMPOSITES

[75] Inventors: James B. Cattanach, Middlesbrough; Eric Nield, Beaconsfield, both of England

[73] Assignee: Imperial Chemical Industries plc, London, England

[21] Appl. No.: 839,176

[22] Filed: Mar. 12, 1986

[30] Foreign Application Priority Data

Mar. 21, 1985 [GB] United Kingdom ................ 8507312
Sep. 25, 1985 [GB] United Kingdom ................ 8523642

[51] Int. Cl.$^4$ ............................................. B29C 43/02
[52] U.S. Cl. ..................................... 264/510; 264/316
[58] Field of Search ............... 264/510, 512, 314, 313, 264/316, 544

[56] References Cited

U.S. PATENT DOCUMENTS

| T857,003 | 12/1968 | French ........................... 264/510 X |
| 2,978,376 | 4/1961 | Hulse ................................. 264/510 |
| 3,140,325 | 7/1964 | Gräff ................................. 264/510 |
| 3,523,149 | 8/1970 | Hartmann ........................ 264/510 |
| 4,478,771 | 10/1984 | Schreiber ....................... 264/510 X |

FOREIGN PATENT DOCUMENTS

| 0155820 | 9/1985 | European Pat. Off. . |
| 0202041 | 11/1986 | European Pat. Off. . |
| 1018180 | 1/1966 | United Kingdom ................ 265/510 |
| 1095524 | 12/1967 | United Kingdom ................ 264/510 |
| 2032926 | 3/1983 | United Kingdom . |

Primary Examiner—Jan H. Silbaugh
Assistant Examiner—Jill L. Fortenberry
Attorney, Agent, or Firm—Cushman, Darby & Darby

[57] ABSTRACT

A method of shaping a body of thermoformable material containing continuous filaments comprising selecting a shaping polymer material having a glass transition temperature which is greater than the glass transition temperature of the thermoformable material of the reinforced body, locating the reinforced thermoformable body between a pair of sheets of the selected shaping polymer, heating the assembly of reinforced body and shaping polymer sheets to a temperature at which the reinforced material can be formed and the shaping polymer can be stretched and applying a differential pressure preferably of not greater than 10 atmospheres, between opposite sides of the assembly of shaping polymer sheets and thermoformable body to induce a desired shaping of the reinforced thermoformable body and cause rearrangement of the filaments relative to each other. The method permits shaping of composite materials containing continuous fibres and greatly reduces the tendency of the fibres to buckle when the composite is shaped.

6 Claims, No Drawings

METHOD OF PRODUCING SHAPED ARTICLES FROM REINFORCED COMPOSITES

This invention relates to a method of producing shaped articles containing fibrous reinforcement from reinforced composite materials, particularly those composites in which the fibres are continuous, collimated fibres.

Methods of impregnating continuous fibres with thermoplastics have recently been devised which enable the exceptionally high physical properties of reinforcing fibres, such as glass or carbon fibres to be fully utilised in composites of continuous fibres. Such composite products having continuous, collimated fibres can be produced as continuous profiles by appropriate profiling of the impregnated product but are generally produced as flat tapes or sheets which are subsequently laid up and consolidated into flat structures having multidirectional reinforcement to provide quasi-isotropic reinforcement in the plane of the structure. Such consolidated structures have exceptional strength and stiffness but by the nature of the continuous fibre reinforcement are difficult to fabricate into shaped articles in processes in which the structure requires to be subjected to any elongation process. European Patent Publication No. 0 155 820 provides an exceptionally effective method of forming such composites in which fluid pressure is applied to a diaphragm of plastically deformable metal to urge a body of composite into a required shape. Preferably the metal is a superplastically deformable metal. Although alloys are commercially available which are suitable for shaping composites in which the matrix polymers has a thermoformable temperature in excess of 300° C., metals for forming composites in which the matrix has a thermoformable temperature of less than 300° C. are not readily available. In addition, the metal diaphragms are normally thrown away as scrap after the operation, adding to the cost of shaping.

A method has now been devised of shaping thermoformable composites, particularly those containing continuous collimated fibres, without the need to employ metal diaphragms.

According to the invention there is provided a method of shaping a body of thermoformable material containing continuous filaments comprising selecting a shaping polymer material from polymers having a glass transition temperature greater than the glass transition temperature of the thermoformable material of the fibre reinforced body, locating the reinforced thermoformable material between a pair of sheets of the selected shaping polymer, heating the assembly of reinforced material and shaping polymer sheets to a temperature at which the reinforced material can be formed and the shaping polymer can be stretched and applying a differential pressure, preferably of not greater than 10 atmospheres, between opposite sides of the assembly of shaping polymer sheets and thermoformable body to induce a desired shaping of the reinforced thermoformable body and cause rearrangement of the filaments relative to each other.

In a preferred method the Tg of the shaping polymer should be at least 100° C. and, desirably, in the case of a thermosetting shaping material, be in excess of 200° C. The shaping material should have sufficient extensibility under the temperature conditions used in the shaping operation to permit stretching of the material without rupture. The material used should preferably have an extension-to-break value at the temperature employed of at least 50%, desirably at least 100% and even more desirably at least 200%.

Whilst the reinforced thermoformable body will normally be of a reinforced thermoplastic polymer body wherein the thermoplastic of the body will have a forming temperature no higher than the thermoplastic body which is urged against it to produce the shaping (hereinafter termed "the polymer shaping body") the invention also includes the use of reinforced thermosettable materials which can be shaped whilst in a flowable condition and subsequently cured.

When the shaping polymer is a thermoplastic polymer it will normally have a minimum forming temperature above that of the reinforced thermoformable body so that the resistance to deformation at a given temperature in the process of shaping the assembly of shaping body and reinforced body is dominated by the thermoplastic polymer shaping body, but this requirement can also be achieved if the two polymers have the same minimum forming temperature. For example, if the thermoplastic polymer shaping body is of the same polymer type as that of the thermoformable reinforced body but is of higher molecular weight or is thicker than the reinforced, thermoformable polymer body then the higher molecular weight or thicker shaping body can be used to dominate the process and control the shaping.

The minimum forming temperature of a thermoplastic polymer is the temperature at which it can be uniformly stretched by at least 20%. In general such a temperature will be at least 20° C. above the glass transition temperature of the polymer and below the decomposition temperature.

When the polymeric materials of the thermoformable polymer and the shaping polymer are amorphous polymers the glass transition temperature of the shaping polymer should be higher than that of the thermoformable polymer and the shaping operation should be carried out above the Tg of the shaping polymer. If both materials are crystalline the shaping operation should preferably be carried out at a temperature above the melting point of the shaping polymer and the thermoformable polymer should have a melting point lower than that of the shaping polymer. The shaping polymer may also be a cross linked thermosetting polymer having a Tg greater than the Tg of the thermoformable polymer to be shaped. In this case the shaping process may be carried out at a temperature below the Tg of the shaping polymer provided that the thermoformable polymer is above its minimum forming temperature if it is a thermoplastic polymer. Cross-linked thermosetting polymers of Tg greater than 100° C. may also be used to advantage for forming composites of reinforced thermosettable materials. These will normally flow without the application of high temperatures and can be formed at temperatures below the Tg of the cross-linked thermosetting polymer.

A major advantage of the invention compared with processes such as hydroforming is that much lower pressures, for example differential pressures of less than 10 atmospheres and desirably less than 1 atmosphere can be employed. This enables the moulding apparatus employed to be not only cheaper but to be operable at considerably greater size to produce larger area mouldings than previously.

Whilst it is preferred that the continuous fibres are present in the reinforced thermoformable body as continuous collimated fibres, preferably extending the width and length of the body to be shaped, the invention includes the use of random fibre reinforced bodies having randomly disposed fibres providing they are at least 20 mm long. Surprisingly, the invention gives the best results with continuous, collimated fibres extending through the dimensions of the body despite the fact that the extensibility of such products is inherently limited. The invention is also useful in the forming of shaped articles in a process in which a plurality of superimposed layers of parallel, collimated, continuous filaments in a thermoplastic matrix, in which the continuous filaments have been severed in predetermined positions, are present and which increase the extent to which the layers can be formed into a shaped article. The position of the cuts in the continuous filaments are predetermined so that on shaping, resulting in slippage of the layers of filaments, discontinuities in the filaments occur in regions of the article which are reinforced with adjacent continuous fibres and that there is no overlap of adjacent discontinuous regions. The process of forming articles from prepregs having predetermined severance lines is described in E.P. No. 155,820.

Conventional techniques such as matched moulds or stamping processes are not suitable for forming continuous fibre composites because they cause extensive buckling of the fibres because it is not possible to conveniently redistribute and accommodate the fibres when the workpiece changes shape into the moulding shaping.

At least one of the pair of sheets may become attached to and integral with the reinforced body as a result of or during the forming operation.

When the thermoplastic polymeric material used to manipulate the thermoformable body into the desired shape becomes integral with the reinforced body in the final shaped article, this may be achieved by using a suitable adhesive, such as a melt adhesive, but it is preferred that, if such an integral surfacing of the shaped article is required when both the shaping body and the thermoformable body are thermoplastics, that the nature of the thermoplastic shaping body should be chosen to be compatible with the polymer of the thermoformable body so that an intimate bond between the two bodies results when they are brought together under the conditions of the process. Some typically suitable combinations of shaping body polymer and polymer of the reinforced body are respectively poly(-methyl methacrylate) and poly(vinyl chloride), polyethersulphones and polyetherketones, and combinations where the polymers are chemically similar but differ in molecular weight, the polymer of the reinforced body being lower in molecular weight. As indicated above some control of the process may also be achieved by using a shaping body which is thicker than the reinforced body.

Preferred reinforced thermoplastics bodies for use in the invention are those in which care has been taken to ensure that the individual filaments making up the reinforcement have been substantially completely wetted by the thermoplastic polymer. In view of the fact that individual reinforcing filaments will usually have a filament diameter of between about 5 and 25 microns the task of wetting all such filaments in a body containing more than 20% by volume of such filaments is difficult when a molten thermoplastic is used because of the high melt viscosity of such materials. Suitable products have recently been developed and can be prepared by the processes described, for example, in European Patent Publication Nos. 56703 and 102 159. These publications disclose processes for the impregnation of rovings of reinforcing fibres and provide continuous lengths of unidirectionally reinforced material which can either be laid up to provide a lay-up of multidirectional reinforcement or can be pre-consolidated into multidirectional quasi-isotropic reinforcement in the plane of the consolidated sheet. Either the loose lay-up or the consolidated sheet can be used in the present invention.

A variety of shaping operations may be employed which may or may not use a mould surface to determine the shape produced. When continuous, collimated fibres are present in the reinforced body it is preferable to form a sandwich from a pair of shaping sheets with the reinforced body between the sheets, the sheets of the sandwich being larger than the reinforced body to be formed so that the sheets can be restrained by clamping about their mutual perimeters in a moulding operation whilst the reinforced body is unrestrained between the sheets and the edges of the composite are left free to move in the direction parallel to the sheets. Surprisingly, the shaping sheets enable the continuous multidirectional reinforcement in the core of the sandwich to be reorganised whilst restraining the core and urging it into the required shape without significant buckling of the filaments occurring.

When a reinforcing body is contained between two shaping sheets it is possible to obtain useful shaped articles without the use of a mould surface by freely blowing or drawing a dome using pressure above and below atmospheric pressure respectively. When a mould is used it may be a female mould into which the heat softened assembly is urged, or a male mould over which the assembly is urged, by a differential pressure, preferably a fluid pressure acting on a shaping sheet.

In one aspect of the invention high, but different, pressures are applied to the assembly, the overall high pressure acting to improve consolidation and the difference in pressure across the assembly acting to control the extent of the shaping required. Typical high pressures used in the process are at least about 3 bar and, preferably, at least about 6 bar, with a differential of at least 0.1 bar. When a pressure differential is applied to one side of the sandwich but not the other the sheet remote from the pressure application may be perforated to ensure that any gases trapped in the sandwich are released.

Alternatively, the space between the two sheets can be evacuated to remove gases. In addition, if the vacuum between the two sheets is sustained whilst the sandwich is being deformed this will maintain a consolidating force upon the plastics/fibre composite additional to any consolidating force resulting from the stretching of the thermoplastic shaping sheets. After deformation the sandwich is allowed to cool so that the deformed composite body is "fixed" in shape.

Although fluid pressures, optionally transmitted through a resilient diaphragm are preferred for urging the assembly into the desired shape, because a uniform pressure is thereby transmitted over the surface of the shaping body other methods of shaping can be employed. Thus, the fluid pressure can be supplemented by plug-assisted forming or the shaping may be effected entirely by matched moulding of two corresponding mould shapes.

When the reinforced thermoformable body contains continuous, collimated fibres extending through the dimensions of the body it is difficult to effect any substantial shaping if the edges of the work piece are restrained because of the inextensible nature of the reinforcing fibres. As hereinbefore indicated it is possible to devise a lay-up of continuous fibre prepreg strips in a thermoformable body which can be shaped according to the invention even though it is restrained at its edges. This involves careful design of a lay-up of the thermoformable body which contains discontinuous lengths of prepreg strips designed so as to ensure that after the desired shaping has taken place there is a controlled overlapping of the ends of successive prepreg strips so that the mechanical properties of the articles are not impaired by discontinuities.

The discontinuous nature of the fibres in a given layer will not be of a random nature but will be predetermined to ensure that a region of discontinuity in the article does not coincide with a discontinuous region in a superimposed layer. The regions of discontinuity will be the minimum required to effect the desired shaping of the sheet.

When the method of the invention is applied to laid up bodies containing such discontinuous lengths the shaping will generally be performed on a number of prepreg plies the fibres of which have been severed in predetermined positions the prepregs being assembled relative to each other so that on shaping the disposition of the fibres is known and the discontinuities are such as not to adversely affect the designed performance of the shaped article.

The lay up of plies in the workpiece should be such that in a given layer only one end of the continuous fibres is restrained so that there is freedom for the given layer to be extended in the direction of alignment of the fibres. It will be clear that plies may be present in the layup in which neither end of the continuous fibres is restrained, but these may only be present to a limited extent and must be supported by other plies in the lay-up.

The extent to which the ends of severed plies should overlap in adjacent plies in the article is determined by the properties required of the final article. Preferably, the overlap should be sufficient to ensure that the shear strength of the overlap should at least be equal to the tensile strength of a single ply sheet of the same thickness so that the axial strength in the direction of the fibres is unaffected by the presence of the overlap.

When the shaping material is a cross-linked polymer having a glass transition temperature, Tg, in excess of the Tg of the thermoformable polymer to be shaped it should have a sufficient extension-to-break value at the forming temperature of the thermoformable polymer to enable the thermoformable polymer to be extended to the required degree. The extension-to-break value should be at least 50% and preferably at least 100%, and desirably at least 200% at the required temperatures. A particularly useful class of polymers are the polyimide films supplied by Ube Industries Limited under the trade name 'Upilex'. The grade designated Upilex R is particularly useful in that a 25 micron thickness film shows an elongation of 150% at 200° C. and an elongation of 250% at 300° C.

Upilex is produced in a polycondensation reaction between 3,3',4,4' biphenyl tetracarboxylic acid or its anhydride, ester or salt, and an aromatic diamine of formula $H_2N-R-NH_2$ to give a polymer with repeat unit

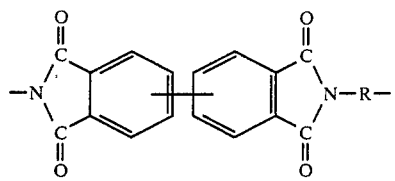

These materials have glass transition temperatures in excess of 250° C.

Preparation of these polyimides is described in British Patent No. 2 032 926B. The preferred aromatic diamines used are of formula

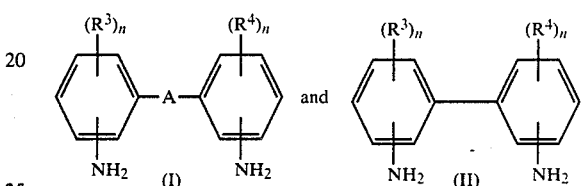

wherein $R^3$ and $R^4$ respectively, independently from each other, represent a member selected from hydrogen atoms, lower alkyl radicals, preferably, having 1 to 3 carbon atoms, alkoxy radicals, preferably, having 1 to 3 carbon atoms, n represents an integer of from 1 to 4, and A represents a divalent radical selected from $-O-$, $-S-$, $-CO-$, $-SO_2-$ $-SO-$, $-CH_2-$ and $-C(CH_3)_2-$.

The aromatic diamines of the formula (I) may involve diamino-diphenyl ether compounds, for example, 4,4'-diaminodiphenyl ether, 3,3'-dimethyl-4,4'-diaminodiphenyl ether 3,3'-diaminodiphenyl ether and 3,3'-dimethoxy-4,4'-diaminodiphenyl ether; diaminodiphenyl thioeither compounds, diamino benzophenone compounds, diamino diphenyl methane compounds and diamino diphenyl propane compounds.

A particularly useful feature of these products is their high thermal stability making it possible to use them at temperatures of the order of 400° C. for limited periods, thus enabling composites in which the matrix polymer has a processing temperature of about 400° C. to be shaped according to the process.

A useful feature of using thin shaping films as compared with plastically deformable metals is that thinner films can be used. This appears to give the advantage, particularly in the case of the polyimide films, that the surface gloss on the shaped article, after removing the shaping films, is enhanced. The film should have sufficient thickness to provide adequate strength and is desirably at least 5 micron thick.

Preferably, the film is at least 20 microns thick but less than 250 microns. The invention is of use for shaping thermoformable materials that are reinforced thermosettable materials which require to be cured at high temperatures. For example, high performance thermosetting polyimide such as those supplied by Du Pont under the trade name 'Avamid' may be shaped to advantage according to the invention using high temperature performance thermoplastic films, particularly films of polyetherketones, such as polyetheretherketone, supplied under the trade name 'Victrex' PEEK by Imperial Chemical Industries PLC or the films of cross-linked polyimides of high Tg hereinbefore described.

When thermosettable materials are used as the thermoformable material provision should be made to permit escape of volatile materials during the curing process. This may be achieved by using a pair of thermoplastic shaping sheets in the forming process, one of which is perforated to allow the escape of volatile materials during the thermoforming process and subsequent forming in the shaping apparatus. Alternatively where the shaping of composite body has sufficient form stability after completion of the shaping operation the cure of the shaping can be accomplished outside the mould to allow escape of volatile materials.

Other advantages that accrue from the use of shaping bodies in the form of thin films or sheets are easy removal of the film from the shaping, improved bend definition, improved component thickness control.

The invention is now described with reference to the accompanying examples.

EXAMPLE 1

In this example a shaped article was produced having outer surfaces of high molecular weight polymethyl methacrylate (PMMA) and a core of glass reinforced polyvinyl chloride. An assembly was made up of two discs of PMMA cast sheet of thickness 1.5 mm having a diameter of 18 cms, enclosing a disc of diameter 14 cms made up of woven tapes in a tabby weave pattern of glass reinforced PVC 2 cm wide and 0.1 mm thick prepared according to the general procedure of European patent publication No. 102 159. An adaptor ring was inserted between the two PMMA discs to coincide with the peripheries of the disc leaving the reinforced woven mat between the discs out of contact with the adaptor ring.

This assembly was placed between two oven halves having diameters coinciding with the adaptor ring and with provision for clamping. The two oven halves together, the oven halves already being at set temperatures of 165° C. The adaptor ring was provided with a radially directed channel through the ring to which vacuum could be applied to evacuate the space between the two outer discs. After location between the oven halves and closing of the oven halves a vacuum of 74 cms of mercury was applied. After a period of 5 minutes to allow for equilibration a pressure differential of 0.2 bar was applied across the laminate using compressed air pressure applied through inlets in the end plates of the oven halves. After a further period of 7 minutes the oven was switched off and fan cooling was applied whilst the pressure was maintained during the assembly in the oven. The pressure was released after 54 minutes and the article removed from the oven. The vacuum applied to the assembly had caused it to contract to a flat laminate when the outer sheets became heat softened and the action of the differential pressure resulted in the formation of a freely blown dome with a depth of draw of 25 mm relative to an unrestrained disc diameter of 95 mm. In those areas of the laminate which had been stretched the continuous fibres had reorganised themselves by relative movement within the core to allow the deformation to take place without fibre breakage. The shaped laminate had an excellent surface area and by visual inspection was seen to be completely consolidated with completely wetted fibres.

EXAMPLE 2

The procedure of Example 1 was repeated using a core of a carbon fibre impregnated with a poly(methyl methacrylate) made according to Example 9 of European Patent Publication No. 102 159. In this example no differential pressure was applied across the laminate. A vacuum of 74 cm of mercury was applied for 3 minutes, after which the oven was switched off and cooling applied by the assistance of an external fan. After 28 minutes the laminate was removed from the oven. A flat laminate was produced in which the reinforced core was integrated with the PMMA skins.

EXAMPLE 3

In this example a shaping was formed from a composite made up of pre-preg carbon fibre impregnated with polyetheretherketone (PEEK) according to the process described in European Patent Application No. 102 159. The pre-preg contained 68% by weight of carbon fibre. This product has a forming temperature of about 380° C.

A laid-up structure was formed from 8 plies of PEEK/carbon fibre pre-preg (commercially available as APC 2 from Imperial Chemical Industries PLC) having a fibre content of 68% by weight. The eight plies were laid up in a quasi-isotropic lay up with the unidirectional fibres in the layers being displaced by 45° C. in successive layers of the lay up to give the configuration (0°,+45, 90°, −45°)s where the angle prescribed gives the direction of the lay-up of the unidirectional fibres with respect to the first ply (0° ) and s signifies that the pattern is repeated symmetrically in the following 4 plies. Each ply was in the form of a circular disc of diameter 15 cms. The forming apparatus used was the pair of oven halves described in Example 1 which when clamped together provided a circular clamping means with inner diameter of approximately 16 cms.

A female metal mould of dish shape, the dish having a circumference of 16 cms and depth of 4 cms, the mould having a lip which could be clamped between the oven halves. This mould was pierced with pin holes to provide a vented tool. The oven halves were preheated to 380° C.

The APC 2 lay-up was placed between two 100 micron thick films of polyimide film obtained from Ube Industries under the trade name Upilex R, the films having a diameter of 18 cm. The films were treated with mould release agent Frekote FRP. An adaptor ring of inner diameter 16 cm and of thickness 6 mm with provision for applying vacuum was placed between the two films, surrounding the lay-up. This assembly was placed over the lower oven half, containing the female mould, and the whole assembly was clamped together at a clamping load of 3000 kg. A vacuum of about 75 cm of mercury was applied through the adaptor ring to remove air from the assembled plies. After 4 minutes pre-heating time air pressure was slowly increased in the upper oven space over a period of 5 minutes until it had reached a 1.7 bar. The shaping produced was then cooled in the mould, the oven temperatures being reduced to 200° C. over a period of 50 minutes. The shaping was removed from the mould and the polyimide diaphragms were peeled from the mould. Visual inspection showed that the APC shaping had a glossy surface of high quality, that the shaping had conformed accurately to the shape of the tool and that the continuous fibres appeared to have reorganised themselves in a controlled manner without evidence of buckling or fibre or tow separation. The polyimide film was permanently set in the shape of the tool and indicated that the permanent elongation of the film, and by deduction the composite, was about 30%.

EXAMPLE 4

The procedure of Example 3 was repeated except in that the reinforced material used was an 8 ply quasi isotropic lay up of thermoset prepreg sheet obtained from Fiberite Winona, USA. The thermoset prepreg was coded 1084P CL084 and had been formed from Toray T300 12K carbon fibre using a thermosetting resin designated 984 Resin as the matrix. The prepreg had a resin content of 33% by weight and a carbon fibre areal weight of 147 g/m².

The oven was preheated to 180° C. After clamping the lay-up vacuum was applied as in Example 3 and the pressure in the top oven was increased to 1.7 bar within 45 seconds. The shaped article was held within the oven at 178° to 180° C. for 2 hours to ensure full cure of the composites. On removing the shaping the polyimide film was peeled off. The quality of the shaped article, by visual inspection was similar to that of Example 3, with very high gloss, good wash-free fibre movement, absence of fibre buckling and good conformity with the tool shape.

The polyimide films, having been formed at a temperature below the Tg of the polymer (approximately 285° C.) did not retain the shape of the mould as they had done in Example 3.

We claim:

1. A method of shaping a body of reinforced thermoformable material formed from prepregs of continuous collimated filaments in a thermoplastics polymer matrix, the prepregs being laid up to give multidirectional reinforcement the reinforcement extending the length and width of the body comprising selecting a shaping polymer material from polymers having a glass transition temperature greater than the glass transition temperature of the thermoformable material of the fibre reinforced body, locating the reinforced thermoformable material between a pair of sheets of the selected shaping polymer, the sheets of shaping polymer having larger dimensions than the reinforced body, clamping the sheets about their mutual perimeters for restraining the sheets whilst the reinforced body is unrestrained between the sheets with the edges of the body being free to move in the direction parallel to the sheets, heating the assembly of reinforced material and shaping polymer sheets to a temperature at which the thermoplastics polymer of the reinforced material is thermoformable and the shaping polymer can be stretched and applying a differential pressure between opposite sides of the assembly of shaping polymer sheets and thermoformable body to stretch the shaping polymer sheets and induce a desired shaping of the reinforced thermoformable body and cause rearrangement of the filaments relative to each other.

2. A method of shaping a body according to claim 1 wherein the glass transition temperature of the shaping polymer material is at least 100° C.

3. A method of shaping a body according to either of claim 1 or 2 wherein the glass transition temperature of the shaping polymer material is at least 200° C.

4. A method of shaping a body according to claim 1 wherein the differential pressure applied is a fluid pressure of less than 10 atmospheres.

5. A method of shaping a body according to claim 1 in which the thermoformable material is a thermoplastic polymer.

6. A method of shaping a body according to claim 1 wherein said prepregs are in the form of strips, and where the strips are of reinforced thermoplastic resin and are consolidated together before shaping.

* * * * *